Patented Jan. 2, 1951

2,536,973

UNITED STATES PATENT OFFICE 2,536,973

SENSITIZING CYANINE DYESTUFF INTERMEDIATES

Alfred W. Anish, Vestal, N. Y., assignor to General Aniline & Film Corporation, New York, N. Y., a corporation of Delaware No Drawing. Application June 21, 1947, Serial No. 756,318

4 Claims. (Cl. 260—240.8)

This invention relates to the preparation of dyestuff intermediates which are of value in the synthesis of dyestuffs capable of optically sensitizing silver-halide photographic emulsions.

According to the present invention dyestuff intermediates are obtained by (1) treating a quaternary salt of a nitrogenous heterocyclic base containing a reactive methyl group in the α-position to the heterocyclic quaternary nitrogen atom with phenyl isothiocyanate or phenyl isoselenocyanate in the presence of an organic base and alcohol, and (2) subsequently alkylating the resulting compound with an alkyl or aralkyl ester. Said dyestuff intermediates and their production constitute the purpose and objects of this invention.

The course of the reaction is as follows.

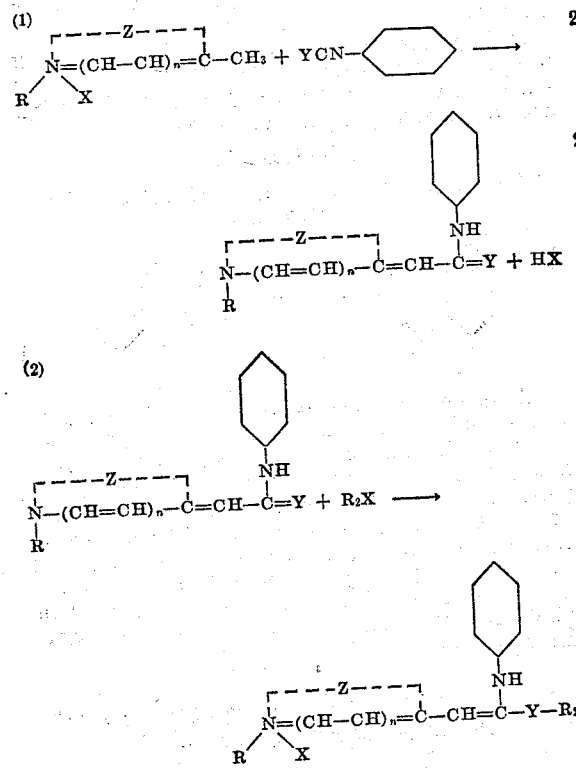

In the foregoing equations R and $R_2$ represent an alkyl or aralkyl group, e. g., methyl, ethyl, propyl, and higher alkyl groups, benzyl or allyl and similar unsubstituted groups, X represents an acid radical, e. g., chloride, bromide, iodide, sulfate, p-toluenesulfonate or perchlorate, Y represents sulfur or selenium, Z represents the residue of a nitrogenous heterocyclic base, and $n$ represents 0 or 1.

Any of the known types of heterocyclic quaternary ammonium compounds, containing the specified reactive methyl group, previously described for use in the manufacture of cyanine dyes may be employed in the process of the present invention. As suitable examples of these compounds may be mentioned, substituted and unsubstituted thiazoles, oxazoles, selenazoles and their polycyclic homologues such as those of the benzene, naphthalene, acenaphthene and anthracene series; pyridine and its polycyclic homologues such as quinoline and α- and β-naphthaquinolines; lepidines; indolenines; diazines; such as pyrimidines and quinazolines; diazoles, oxazolines, thiazolines and selenazolines.

Reaction 1 is effected by dissolving a molecular equivalent of the heterocyclic quaternary ammonium compound, containing the specified reactive methyl group, and a slight excess (10%) of a molecular equivalent of phenyl isothiocyanate or phenyl isoselenocyanate in a sufficient quantity of a saturated lower aliphatic alcohol such as methanol, ethanol, propanol, isopropanol, etc., to effectuate solution. To this solution a sufficient quantity of an organic base such as an alkylamine, e. g., dimethyl, diethylamine, trimethyl or triethylamine, is added and the solution allowed to stand at room temperature for a period of time ranging from 12 to 20 hours. The crystals, which form during this time, are filtered off and washed with alcohol and dried.

Reaction 2 is effected by heating a molecular equivalent of the foregoing product with about 1½ to 4 molecular equivalents of an alkyl or aralkyl ester, usually employed in the cyanine dye art for quaternizing dye bases, such as, for example, dimethyl or diethyl sulfate, benzyl iodide, methyl-p-toluenesulfonate, and the like, in a closed vessel, at a temperature ranging from 120° to 160° C. from 2 to 6 hours. The reaction mixture is cooled, boiled with acetone, alcohol added, and the crystals precipitated with ether. The final product is purified by precipitation with ether from a methanol-acetone solution.

Details of the production of the dyestuff intermediates and their utilization in the synthesis of optical sensitizing dyes will be more clearly demonstrated in the following examples. It is to be understood that the following examples are merely illustrative and the invention is not to be regarded as restricted thereto.

EXAMPLE I

*2 - (β - anilino - β - ethylmercaptovinyl-) 3-ethyl-benzothiazolium iodide*

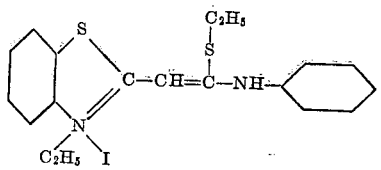

100 grams of 3-ethyl-2-methylbenzothiazolium iodide and 48.0 grams of phenyl isothiocyanante were dissolved in 160.0 cc. of methanol and 32.0 cc. of triethylamine added. The mixture was thoroughly shaken and allowed to stand overnight in a stoppered flask. The crystals which formed on standing were filtered and washed with a minimum amount of methanol.

5 cc. of additional triethylamine were added to the filtrate and washings, causing precipitation upon standing. A final crop of crystals was obtained by heating the filtrate on a steam bath in the presence of an additional quantity of triethylamine. This procedure yielded 65.0 grams of light yellow crystals, α-(3-ethylbenzothiazolylidene-) thioacetanilide, melting at 191-191.5° C.

30 grams of α-(3-ethylbenzothiazolylidene-) thioacetanilide and 50 cc. of ethyl iodide were heated in a sealed vessel at 160° C. for 4 hours. The crude reaction product was boiled out with 400 cc. of acetone and the resulting solid further purified by solution in a methanol-acetone mixture. Subsequent precipitation with ether yielded crystals melting at 161-162° C.

EXAMPLE II

*2-(β-anilino-β-methylmercaptovinyl-)6,7-benzo-3-ethylbenzothiazolium iodide*

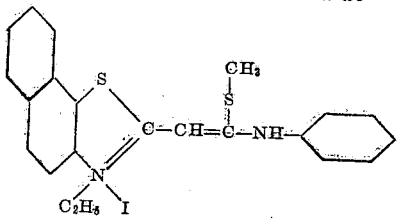

100 grams of 6,7-benzo-3-ethyl-2-methylbenzothiazolium-p-toluenesulfonate and 35 grams of phenyl isothiocyanate were dissolved in 100 cc. of methanol. The mixture was treated with 20 cc. of triethylamine and allowed to stand at room temperature for 12 hours. The resulting crystalline product was filtered and washed with methanol. An additional amount of product was obtained by treating the filtrate with 5 cc. of triethylamine and allowing it to stand at room temperature for several hours. A total yield of 47 grams of α-(6,7-benzo-3-ethylbenzothiazolylidene-) thioacetanilide was obtained. Alkylation with methyl iodide yielded the final product.

EXAMPLE III

*2-(β-anilino-β-benzylselenovinyl-) 3-ethylbenzothiazolium iodide*

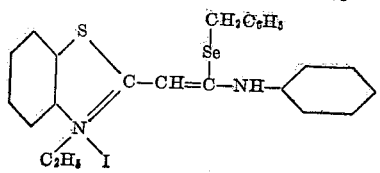

1.2 grams of 3-ethyl-2-methylbenzothiazolium-p-toluene-sulfonate, 0.7 gram of phenyl isoselenocyanate, and 0.4 gram of triethylamine were dissolved in the minimum amount of methanol and allowed to stand at room temperature for 12 hours. 0.5 gram of crude product separated and was purified by crystallization from methanol to yield crystals melting at 170-175° C. Alkylation with benzyl iodide yielded the final product.

EXAMPLE IV

*2-(β-anilino-β-ethylmercaptovinyl-) 3-ethyl-benzoselenazolium iodide*

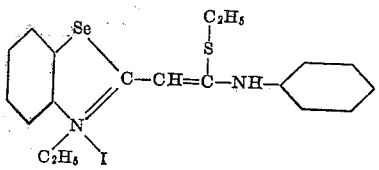

Example I was repeated with the exception that 116 grams of 3-ethyl-2-methylbenzoselenazolium iodide were substituted for 100 grams of 3-ethyl-2-methylbenzothiazolium iodide.

EXAMPLE V

*2-(β-anilino-β-ethylmercaptovinyl-) 3-ethylbenzoxazolium iodide*

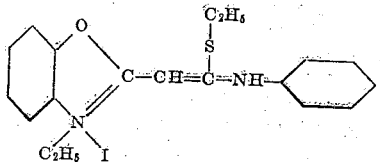

Example I was again repeated with the exception that 97 grams of 3-ethyl-2-methylbenzoxazolium iodide were substituted for 100 grams of 3-ethyl-2-methylbenzothiazolium iodide.

The dyestuff intermediates, prepared according to the preceding examples, may be utilized in the synthesis of various types of optical sensitizing dyes as illustrated in the following examples.

EXAMPLE VI

*3,3'-diethyl-9-ethylmercapto-selenathiacarbocyanine iodide*

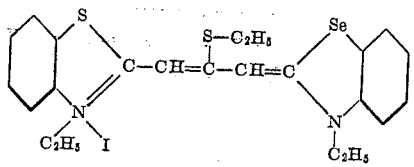

0.5 gram of 2-(β-anilino-β-ethylmercaptovinyl-)3-ethylbenzothiazolium iodide, prepared according to Example I, 0.4 gram of 3-ethyl-2-methylbenzoselenazolium iodide, 5 cc. of isopropanol, and 5 drops of triethylamine were heated at reflux for 1 hour. The product separated as crystals on standing at room temperature and was purified by recrystallization from ethyl alcohol. The dye extends the sensitization of a photographic emulsion to 700 mμ, with a maximum at 670 mμ.

EXAMPLE VII

*3,3' - diethyl - 9 - ethylmercapto - 5',6' - methylenedioxy-thiacarbocyanine iodide*

0.5 gram of 2-(β-anilino-β-ethylmercaptovinyl-)3-ethylbenzothiazolium iodide, prepared according to Example I, 0.4 gram of 3-ethyl-2-methyl-5,6 methylenedioxybenzothiazolium-p-toluenesulfonate, 5 cc. of methanol, and 5 drops of triethylamine were heated at reflux for 15 minutes. The dye separated on cooling and was purified by washing with dioxane and crystallization from methanol to yield crystals melting at 201° C. The dye extends the sensitization of a photographic emulsion to 680 mμ, with a maximum at 640 mμ.

EXAMPLE VIII

5 - [β - (3 - ethyl - 2 - benzothiazolylidene - )α-ethylmercaptoethylidene-]3-ethylrhodanine

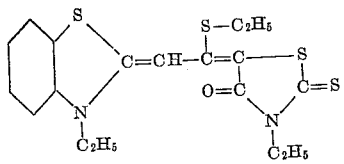

4 grams of 3-ethylrhodanine and 5.0 grams of 2-(β-anilino-β-ethylmercaptovinyl-)3-ethylbenzothiazolium iodide were dissolved in 50.0 cc. of isopropyl alcohol and 5.0 cc. of triethylamine added. The mixture was heated on a steam bath for 15 minutes and the crystals which separated were filtered off and washed with isopropyl alcohol. The dye was further purified by dissolving in hot dioxane, filtering and precipitating with methyl alcohol. The dye sensitizes a photographic emulsion to 640 mμ, with a maximum at 610 mμ.

EXAMPLE IX

5 - [β - (3-ethyl-2-benzothiazolylidene-)α-ethylmercaptoethylidene - ]4,5 - dihydro-3-ethyl-2-(3 - ethyl - 2 - benzothiazolylidenemethyl - )4-keto-thiazolium iodide

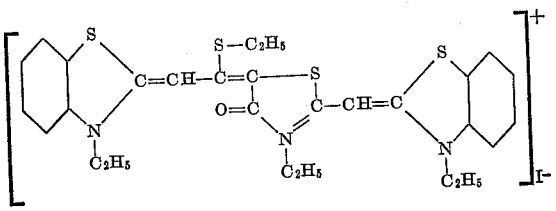

4 grams of 5-[β-(3-ethyl-2-benzothiazolylidene-)α-ethylmercaptoethylidene-]3 - ethylrhodanine, prepared according to Example VIII, and 5 grams of dimethyl sulfate were heated in a sealed vessel at 110° C. for 10 minutes. 20 cc. of pyridine and 3 grams of 3-ethyl-2-methylbenzothiazolium iodide were added and the mixture heated at reflux for 40 minutes. Green dye crystals separated on cooling and were purified by washing with dioxane and crystallization from pyridine. A solution of the dye in methanol has an absorption maximum at 620 mμ. The dye sensitizes a photographic emulsion to 720 mμ, with a maximum at 680 mμ.

I claim:
1. Dyestuff intermediates of the general formula:

wherein R and $R_2$ are members selected from the group consisting of alkyl and aralkyl groups, X is an acid radical, Y is a member selected from the group consisting of sulfur and selenium, Z represents the atoms necessary to complete a heterocyclic nitrogenous compound, and $n$ is a member selected from the class consisting of 0 and 1.

2. A dyestuff intermediate characterized by the following formula:

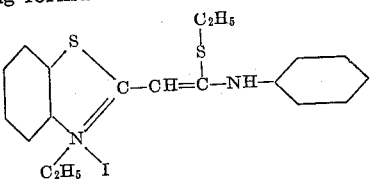

3. A dyestuff intermediate characterized by the following formula:

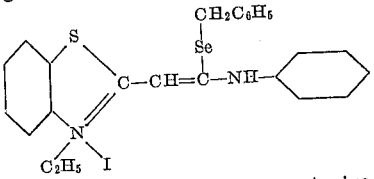

4. A dyestuff intermediate characterized by the following formula:

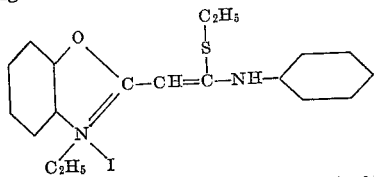

ALFRED W. ANISH.

REFERENCES CITED

The following references are of record in the file of this patent:

UNITED STATES PATENTS

| Number | Name | Date |
|---|---|---|
| 2,349,179 | Kumetat | May 16, 1944 |
| 2,369,657 | Brooker | Feb. 20, 1945 |
| 2,450,400 | Thompson | Sept. 28, 1948 |

FOREIGN PATENTS

| Number | Country | Date |
|---|---|---|
| 555,936 | Great Britain | Sept. 13, 1943 |

OTHER REFERENCES

Schneider: Berichte, 51 (1924), pp. 522–531.
Migidichian: Chemistry of Organic Cyanogen Compound (1947), p. 386.